United States Patent [19]
Woitzel

[11] Patent Number: 4,721,602
[45] Date of Patent: Jan. 26, 1988

[54] MIXING HEAD FOR THE MIXING OF AT LEAST TWO COMPONENTS FORMING A SYNTHETIC MATERIAL

[75] Inventor: Heinz Woitzel, Ibbenbüren, Fed. Rep. of Germany

[73] Assignee: IBW Ingenieur-Büro Woitzel GmbH, Ibbenbüren, Fed. Rep. of Germany

[21] Appl. No.: 872,054

[22] Filed: Jun. 6, 1986

[30] Foreign Application Priority Data

Jun. 13, 1985 [DE] Fed. Rep. of Germany ....... 3521236

[51] Int. Cl.⁴ .............................................. B01F 5/04
[52] U.S. Cl. ...................... 422/133; 422/135; 422/224; 366/184; 366/307; 366/337; 222/557
[58] Field of Search ............ 422/133, 135, 224; 425/244; 366/184, 307, 336, 337; 222/190, 556, 557; 239/461, 590.5

[56] References Cited

U.S. PATENT DOCUMENTS

| | | | |
|---|---|---|---|
| 2,684,690 | 7/1954 | Lee | 239/590.5 |
| 4,141,470 | 2/1979 | Schulte et al. | 422/133 |
| 4,440,500 | 4/1984 | Schneider | 422/133 |
| 4,442,070 | 4/1984 | Proksa et al. | 422/133 |

FOREIGN PATENT DOCUMENTS

138592 11/1901 U.S.S.R. .............................. 366/336

Primary Examiner—David L. Lacey
Attorney, Agent, or Firm—Jordan and Hamburg

[57] ABSTRACT

The invention relates to a mixing head for the mixing of at least two components forming a synthetic material, the mixing head comprising a mixing chamber and a discharging channel which is guided in a guide channel having a symmetrical cross-section. The mixing head is operable to provide mechanical self-cleaning of the discharging channel and mixing chamber by a discharging piston. An intensive mixing of the reaction components is achieved along with stabilization of the liquid mixture of the components after the mixture has left the mixing chamber in that a throttle member provided at the downstream end of the mixing chamber, is movable in and out of the cross-section of the channel and forms in its throttling position, a throttle slit which is flared towards the outlet opening of the discharging channel like a diffusor.

27 Claims, 19 Drawing Figures

MIXING HEAD FOR THE MIXING OF AT LEAST TWO COMPONENTS FORMING A SYNTHETIC MATERIAL

BACKGROUND OF THE INVENTION

This invention relates to a mixing head for the mixing of at least two components forming a synthetic material.

In a known mixing head of this kind for the mixing of components of synthetic material which form a foamed synthetic material, in particular, a polyurethane foam during their chemical reactions, the throttling member is formed by a throttle slider with a through-hole having a diameter which corresponds to the diameter of the guide channel or discharging channel. In the correspondingly aligned position of the through-bore of the throttle slider with the channel, a mechanical cleaning of the mixing chamber and the discharging channel is possible by means of a discharging piston, whereas with respect to the channel transversally off-set position of the through-hole of the throttle slider, by formation of a tapered over-flow opening between the mixing chamber and the inside of the through-hole, there is formed a turbulence chamber on the inside of the bore, by means of which the mixing intensity of the reaction components should be improved. Because of the configuration of such a turbulence chamber, there results great turbulence of the liquid mixture of the components, which turbulence, even in a discharging channel of constant cross-section, does not undergo any stabilization after leaving the turbulence chamber sufficient to prevent defects in the product, in particular air occlusions occur.

Furthermore, there is known a mixing head for the production of a chemically reactive mixture consisting of at least two components of a synthetic material of the indicated kind, which mixing head has a throttle member consisting of several baffle barriers which are aligned in a row or off-set next to one another and/or behind one another, which baffle barriers can be inserted into the mixing chamber from the opposite sides of the mixing chamber. An advantageous mechanical self-cleaning of the discharging channel and the mixing chamber by means of the discharging piston is also attained in this case when the baffle barriers are pulled out of the mixing chamber. However, in this known case, the liquid mixture of the components being forced through a multitude of squeezer slits and being injected at high speed into the mixing chamber does not undergo a sufficient reduction of the resulting turbulence which therefore results in defects in the product to be produced, in particular, in shaped products.

SUMMARY OF THE INVENTION

An object of the present invention is to provide a mixing head for the mixing of at least two components constituting a synthetic material of the initially described kind, in which mixing head, while maintaining the mechanical self-cleaning of the discharging channel and the mixing chamber by means of the discharging piston, also attains an intensive mixing of the reaction components and a stabilization of the liquid mixture of the components after the mixture has left the mixing chamber, to such a degree that defects due to mixing turbulences are to the greatest possible extent prevented in the product to be produced.

According to this invention, the throttle member at the outlet end of the mixing chamber forms a throttle slit which extends over the cross-section of the outlet channel and which throttle slit improves the mixing intensity by a pressure effect, and which throttle slit is flared towards the outlet opening of the outlet channel in a diffusor-like manner in order to attain in this way inside the mixing head, while utilizing the known diffusor effect, an extensive stabilization of the liquid mixture of the components, i.e., a conversion of the turbulent flow into an essentially laminar flow so that defects in the product, which otherwise would result due to remaining turbulence, are to the greatest possible extent prevented.

Numerous other characteristics and advantages of the invention result from the dependent claims and the following description in connection with the drawings, in which several embodiments of the object of the invention are schematically illustrated. The drawings show the following:

DESCRIPTION OF THE PREFERRED EMBODIMENTS

Figure 1:
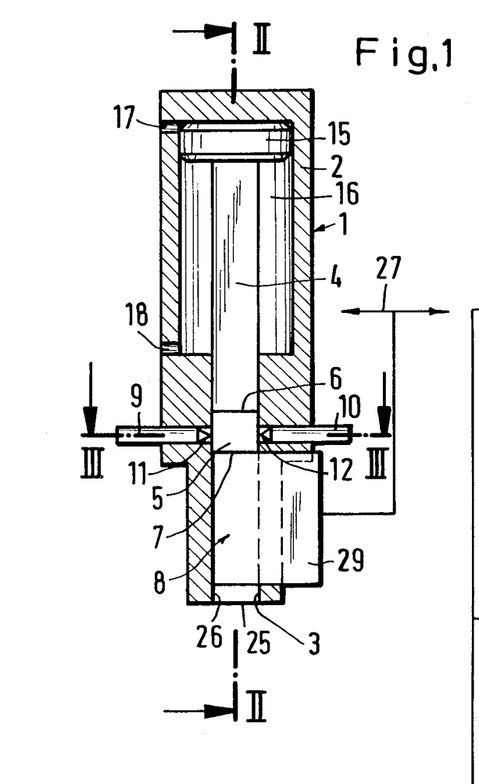
FIG. 1 is a longitudinal cross-sectional view through a first embodiment of a mixing head, wherein the discharging piston and the throttle member are shown in their mixing position.

In the drawings there is illustrated a mixing head for the mixing of at least two components of a synthetic material, the mixing head having the designation 1 as a unit, the components of the synthetic material forming during their reaction, for example, a foam rubber, in particular, a polyurethane foam. The mixing head 1 consists of a housing 2 with a guide bore 3 in which a discharging piston 4 is guided for reciprocating motion. One area of the guide bore 3 constitutes a mixing chamber 5 which, in the withdrawn position of the discharging piston 4, for instance, as shown in FIG. 1, borders on one end on the frontal side 6 of the discharging piston 4. The other end of the mixing chamber 5 borders on the side 7 of a throttle member 8 which is arranged opposite to the frontal surface 6 of the discharging piston 4. Component feeds 9 and 10 communicate with intake openings 11 and 12 respectively, which in turn communicate with the mixing chamber 5. Return ducts are indicated at 13 and 14 (FIG. 3). At its end away from the mixing chamber 5, the discharging piston 4 is constructed as a hydraulic piston 15 to which pressure can be applied from both sides and which is guided in a cylinder 16 having respective feed connections 17 and 18.

Figure 3:
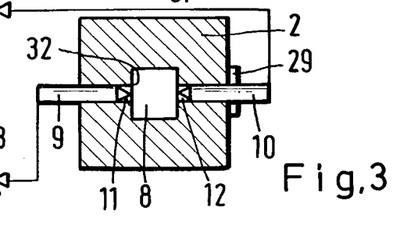
FIG. 3 is a sectional view taken along the line III—III of FIG. 1, with additional parts added to facilitate explanation of the operation of the mixing head.

In FIG. 3 there are shown supply vessels 19 and 20 for the two reaction components from which the respective components are injected at high speed by means of a dosaging pump 21, 22 via the feeds 9, 10 into the mixing chamber 5 according to the counter-flow injection principle in order to form therein the reaction mixture. At the end of the injection time, path valves 23, 24 are switched over to the return feeds 13 and 14, so that the components conveyed out of the supply vessels 19, 20 are recirculated. For the execution of this working procedure, the mixing head can be regulated either by a nozzle, by pressure, or by a piston in a known way.

Figure 4:
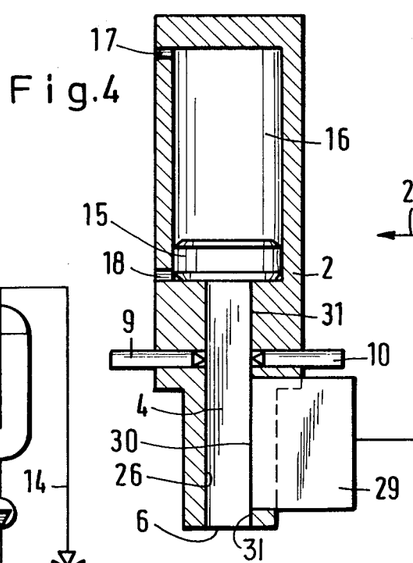
FIG. 4 is a view similar to FIG. 1, however, wherein the discharging piston and the throttle member are shown in their cleaning position.
Figure 5:
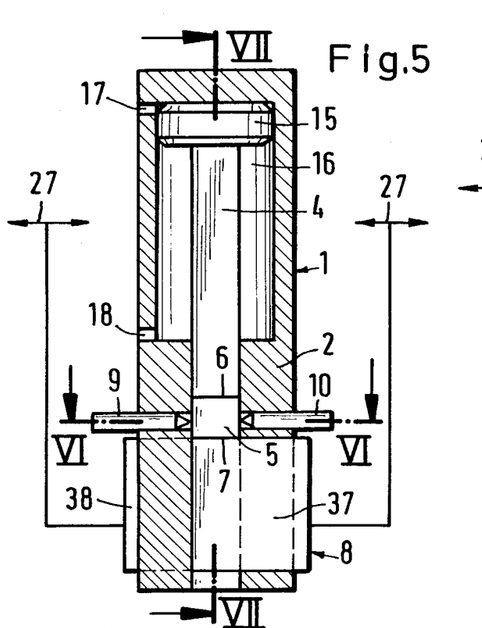
FIG. 5 is a longitudinal cross-sectional view of another embodiment of a mixing head, wherein the discharging piston and the throttle member are shown in their mixing position.
Figure 6:
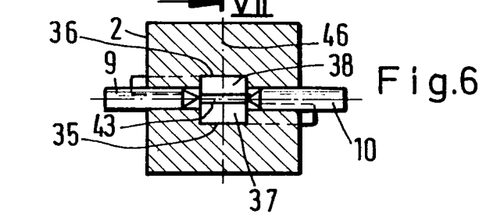
FIG. 6 is a view taken along the line VI—VI of FIG. 5.
Figure 7:
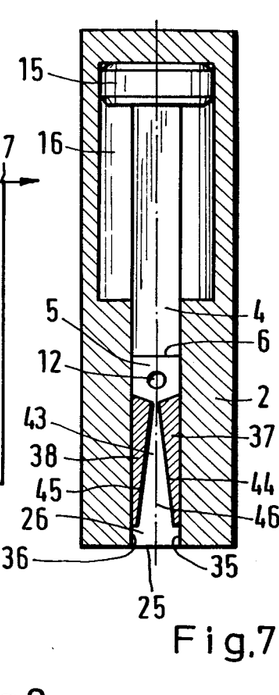
FIG. 7 is a view taken along the line VII—VII of FIG. 5.

The guide channel 3 has a rectangular cross-section, whereby in the embodiment according to FIGS. 1 to 4, one of the four sides of the rectangle of the channel cross-section is partially occupied by the throttle member 8, the length of which extends from the mixing chamber 5 essentially to the discharge opening 25 of the guide channel 3 which forms in this area a discharging channel 26. Thereby, the throttle member 8 can reciprocate between a withdrawn position as shown in FIG. 4, which frees the rectangular or quadratic channel cross-section, and a throttling position engaging the channel cross-section, as shown in FIG. 1. This reciprocating mobility of the throttle member 8 is indicated by the double arrow 27 in FIG. 1.

Figure 2:
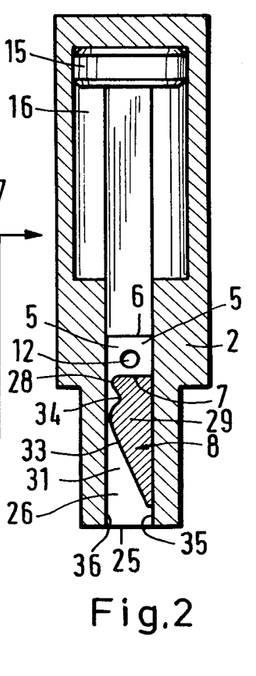
FIG. 2 is a sectional view taken along the line II—II of FIG. 1.

In the throttling position which corresponds to the mixing position of the throttle member 8 and the discharging piston 4, the throttle member 8 forms a throttle slit 28 at the downstream end of the mixing chamber 5 as illustrated in the above-mentioned embodiment of FIG. 2. The throttle slit 28 extends transversally through the entire channel cross-section and is flared towards the discharge opening 25 like a diffusor.

In the embodiment according to FIGS. 1 to 4, the throttle member 8 comprises a wall plate 29 having a frontal surface 30 facing the discharging channel 26 such that the channel cross-section is free in the withdrawn position of the throttle member 8, and the frontal surface 30 is arranged on a joint plane with the adjacent wall surface 31 of the channel 26 to complete the boundary rectangular cross-sectional of the discharging channel 26. In this position the mixture of the components for the mechanical auto-cleaning passes through the mixing chamber 5 and discharge channel 26 by means of the discharging piston 4, as shown in FIG. 4.

In order to attain the throttling position, the wall plate 29 is inserted in the discharging channel 26 until it makes contact with the facing side 32 of the channel cross-section. The free channel cross-section is thereby reduced by the wall surface 33 of the wall plate 29, whereby one section of the wall surface 33 narrows towards the discharge opening 25 of the discharging channel 26 in order to form the diffusor-like flaring of the throttle slit 28. This steady narrowing at the wall surface 33 is interrupted by another profile section 34 in the area immediately adjacent to the mixing chamber 5. Thus there is attained a contouring of the throttle wall surface 33 which is adapted to the special flow requirements.

The wall plate 29 is slidably supported in a cross-sectionally synmetrical receiving opening of the housing 2 which is perpendicular to the longitudinal axis of the discharging channel 26 and parallel to the side 35 of the rectangle of the channel cross-section. In this way, an auto-cleaning of the wall plate 29 also occurs when the wall plate 29 is withdrawn out of the channel cross-section.

Figure 8:
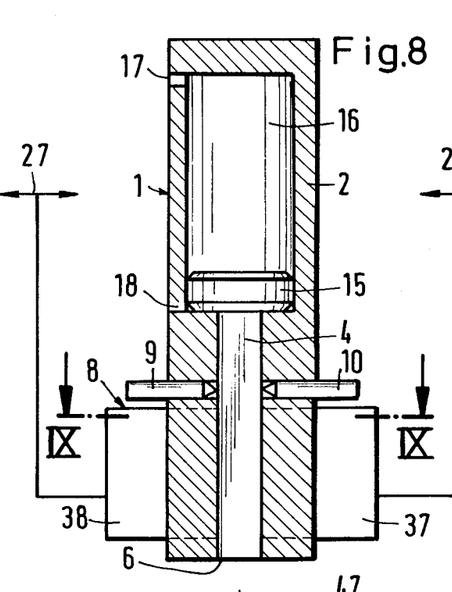
FIG. 8 is a view similar to FIG. 5, however, wherein the discharging piston and the throttle member are shown in their cleaning position.
Figure 9:
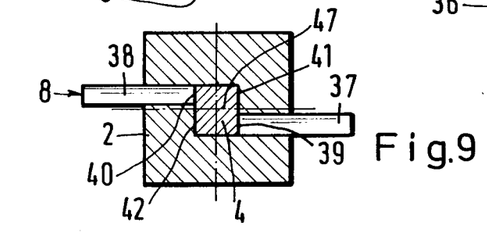
FIG. 9 is a cross-sectional view taken along the line IX—IX of FIG. 8.

In the embodiment according to FIGS. 5 to 9, the throttle member 8 is formed by two wall plates 37 and 38 which are disposed against the facing sides 35, 36 of the channel cross-section and which have frontal surfaces 39 and 40 facing the discharging channel 26. When the wall plates 37, 38 are in their withdrawn position, the channel cross-section is open as shown in FIG. 8, and the wall plates 37, 38 are arranged on a joint plane with the adjacent wall surface 41, 42 of the channel to complete the rectangular cross-sectional periphery of the channel 26 on the two oppositely arranged sides of the rectangle which form the cross-section of the channel. In this position the discharging stroke of the discharging piston 4 occurs as can be seen in FIGS. 8 and 9. Also, in this case, the two wall plates 37 and 38 are respectively displaceably guided in the opposite direction in a cross-sectionally symmetrical receiving opening of the housing 2, so that the wall plates 37 and 38, during their return motion out of the channel cross-section, undergo a mechanical self-cleaning during their parallel shifting.

Whereas in the exemplary embodiment according to FIGS. 1 to 4 the diffusor-like flared throttle slit 28 is formed by the wall surface 33 of the throttle member 8 and the wall surface 36 of the discharging channel 26 positioned oppositely thereto, in the exemplary embodiment according to FIGS. 5 to 9 there is provided a diffusor-like flared throttle slit 43 which is bordered by the facingly positioned wall surfaces 44 and 45 of the two wall plates 37 and 38. On both sides of a centered, longitudinal plane of symmetry 46 of the outlet channel 26, the two wall plates 37, 38 having a basically wedge-shaped cross-sectional shape are provided with a mirror-symmetrical configuration, whereas the greatest width of the wall plates 37, 38, measured in the transverse direction to their shifting direction (arrow 27), is smaller than the width of the side 41 or 42 of the rectangle of the channel cross-section extending in the same direction. The wall plates 37, 38 are thereby arranged on both sides of a longitudinal center plane 47, which extends perpendicularly to the plane 46, at a respective distance in order to form the throttle slit 43 and, in the throttling position, surfaces of the wall plates 37, 38 opposite to the peripheral surfaces 44, 45 of the slit make contact with the sides 35, 36 of the rectangle of the channel cross-section.

Figure 10:
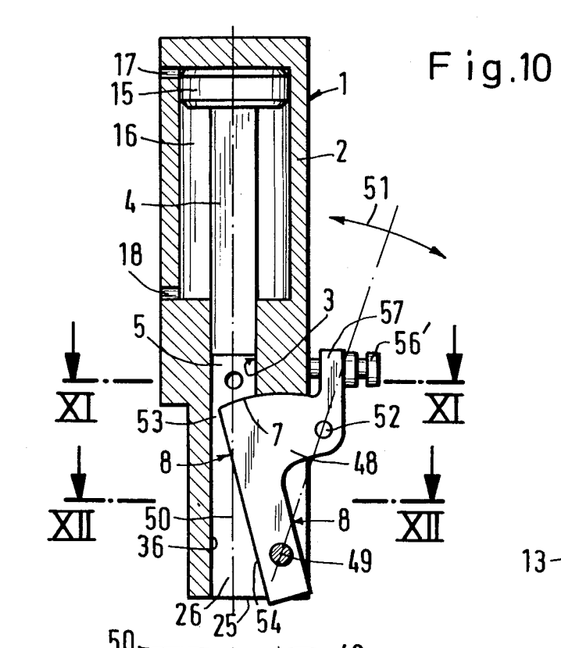
FIG. 10 is a longitudinal cross-sectional view of another embodiment of a mixing head, wherein the discharging piston and the throttle member are shown in their mixing position.
Figures 11, 13:
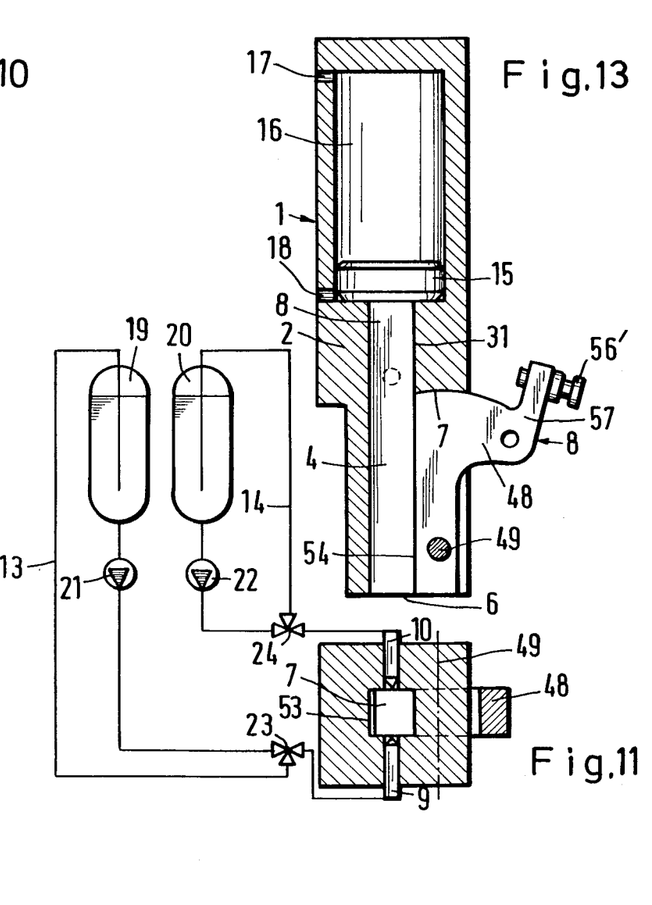
FIG. 11 is a view taken along the line XI—XI of FIG. 10, with additional parts added to facilitate explanation of the operation of the mixing head.
FIG. 13 is a view similar to FIG. 10, however, wherein the discharging piston and the throttle member are shown in their cleaning position.

In the exemplified embodiment according to FIGS. 10 to 13, the throttle member 8 is formed by a wall plate 48 which is pivotally supported about an axis 49 in the housing 2. The axis 49 extends perpendicularly to the longitudinal direction of the guide channel 3 and is parallel to a plane 50 which includes the longitudinal axis thereof. The wall plate 48 can be swivelled back and forth on its swivelling axis 49 in the direction of the double arrow 51 between a throttling position engaging the channel cross-section (FIG. 10) and a withdrawn position which frees the cross-section of the channel (FIG. 13). The wall plate 48 can be swivelled by means of a suitable operating apparatus, such as, for example, a pressure-medium-operated working cylinder, which is swivelled at 52 on the wall plate 48.

Figure 12:
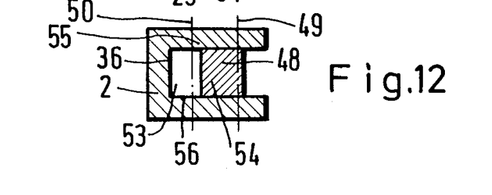
FIG. 12 is a view taken along the line XII—XII of FIG. 10.

In the inwardly swivelled throttling position as shown in FIGS. 10, 11 and 12, the wall plate 48 forms a throttle slit 53 located at the downstream end of the mixing chamber 5, which slit also flares in a diffusor-like fashion towards the outlet opening 25. The width of the wall plate 48, measured in the transversal direction to its swivelling direction 51, is thereby equal to the width of one side of the rectangular channel cross-section, as can be seen especially in FIGS. 11 and 12. In this configuration, the throttle slit 53 is formed between the frontal surface 54, which is the leading surface during inward swivelling, and the facing wall surface 36 of the channel cross-section, such frontal surface 54 being disposed at an acute angle relative to the plane 50 which includes the longitudinal axis of the guide channel 3 as clearly shown in FIG. 10.

In order to form the throttle slit 53, the wall plate 48 is swivelled in the pivoting direction 51 by a respective amount into the cross-section of the channel, which amount is less than the length of the sides 55, 56 of the rectangular channel cross-section; the sides 55, 56 extending parallel to the swivelling direction 51. Thus, the throttle slit 53 is always formed at the downstream end of the mixing chamber 5 by the adjacent surface 7 of the wall plate 48 or its frontal surface 54 in conjunction with the opposite wall surface 36 of the discharging channel 26. In order to attain various throttle resistances, the width of the throttle slit 53, measured in the pivoting direction 51, can thereby be adjusted with a stop screw 56' which is screwed into an outer projection 57 of the wall plate 48. The stop screw 56' makes contact with the housing 2 with its frontal end which extends out of the projection 57 on the housing side during the inward swivelling of the wall plate 48. Furthermore, the distance between the swivelling axis 49 and the mixing chamber 5 can be changed for the adjustment of various angles of the diffusor opening by means of correspondingly different positional points of the rotational axis 49.

FIG. 13 shows the wall plate 48 in the position in which it is moved out of the channel cross-section and in which its wall surface 54 is in corresponding alignment with the wall surface 31 of the channel which borders on the hydraulic piston 15, so that the discharging piston 8 can execute its discharging and cleaning stroke. The wall plate 48 is also guided in a receiver of symmetrical cross-section in the housing 2, so that it undergoes for its part a mechanical self-cleaning during its return motion into the position shown in FIG. 13.

The exemplified embodiment according to FIGS. 14 to 17 is different from that according to FIGS. 10 to 13 in that, instead of the wall plate 48 which forms the throttle member 8, there are provided two facingly arranged wall plates 48', which respectively have the same configuration as the wall plate 48. The wall plates 48' are mirror-symmetrically arranged on both sides of the central longitudinal symmetrical plane 58 of the discharging channel 26 and are supported around their axe 49 in the housing 2 so that they can be reciprocatingly swivelled in and out in the direction of the arrows 51 in the discharging channel 26.

Figures 14, 15, 16, 17:
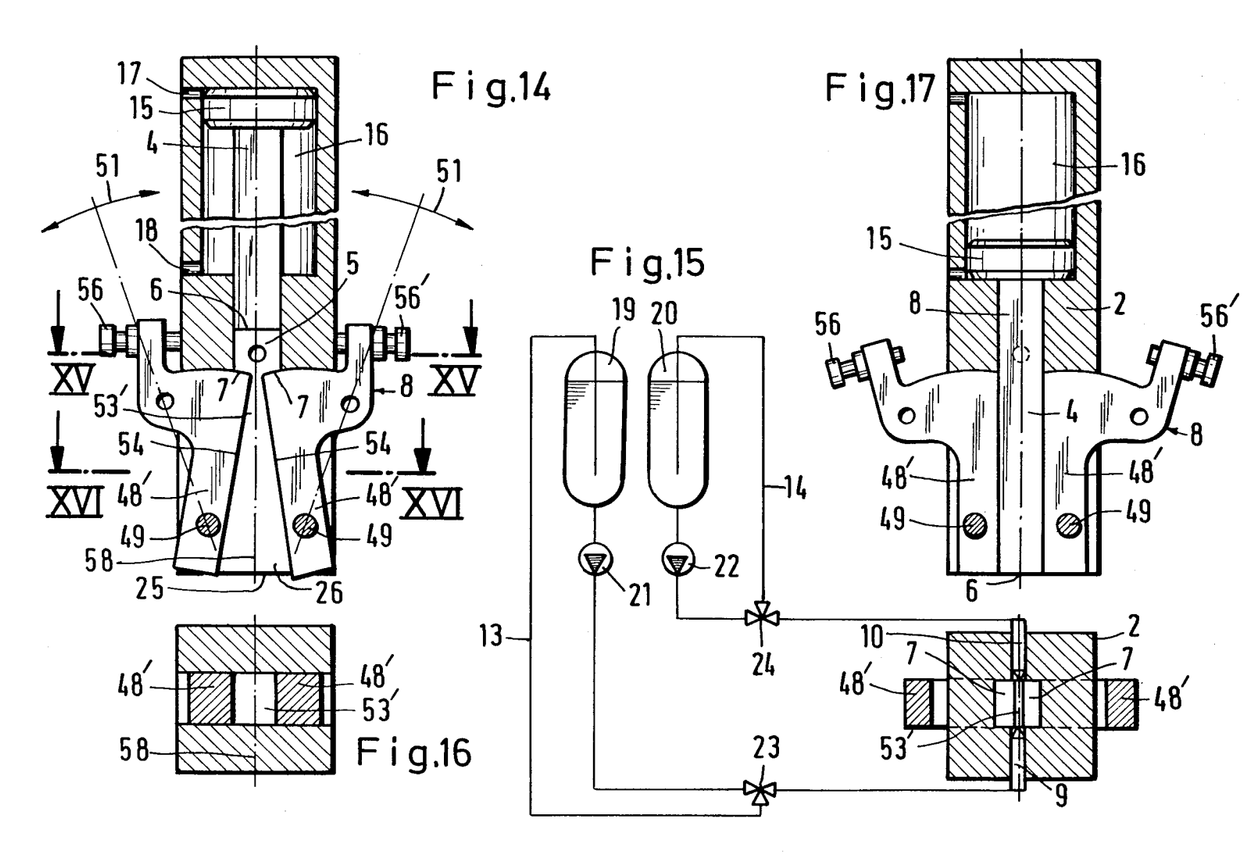
FIG. 14 is a view of another embodiment of a mixing head in longitudinal cross-section, wherein the discharging piston and the throttle member are shown in their mixing position.
FIG. 15 is a view taken along the line XV—XV of FIG. 14, with additional parts added to facilitate explanation of the operation of the mixing head.
FIG. 16 is a view taken along the line XVI—XVI of FIG. 14.
FIG. 17 is a view similar to FIG. 14, however, wherein the discharging piston and the throttle member are shown in their cleaning position.

In the inwardly swivelled throttle position shown in FIGS. 14, 15 and 16, the wall plates 48' form between each other with their facingly arranged frontal surfaces 54 the throttle slit 53' which, like the throttle slit 53, is flared like a diffusor towards the discharging end 25 of the discharging channel 26. However, whereas both the throttle slit 53 of the exemplified embodiment according to FIGS. 10 to 13, and the throttle slit 28 of the exemplified embodiment according to FIGS. 1 to 4, have a cross-section for the throttle corresponding approximately only to one half of the diffusor, both the throttle slit 53' of the exemplified embodiment according to FIGS. 14 to 17, and the throttle slit 43 of the exemplified embodiment according to FIGS. 5 to 7 correspond in their cross-sections to an entire diffusor because of the continuous widening of the throttle slit on both sides by means of the facingly arranged wall surfaces of the throttle member 8.

FIG. 17 shows the two wall plates 48' in the position in which they are swivelled out of the cross-section of the channel, in which, analogous to the exemplified embodiment according to FIGS. 10 to 13, there occurs the discharging and cleaning stroke of the discharging piston 4, which is guided in the guide channel 3 of symmetrical cross-section.

In other respects, the additional specifications set forth for the wall plate 48 of the exemplified embodiment according to FIGS. 10 to 13 also apply to the wall plates 48' of the exemplified embodiment according to FIGS. 14 to 17, in which the same reference symbols were used as in the aforementioned exemplified embodiments for the same or similar parts, thus omitting a repeated description. Furthermore, this also applies to all of the exemplified embodiments of the illustrated and specified mixing head and, in particular, also to the additional exemplified embodiments according to FIGS. 18 and 19 which will be described hereinafter.

Figure 18:
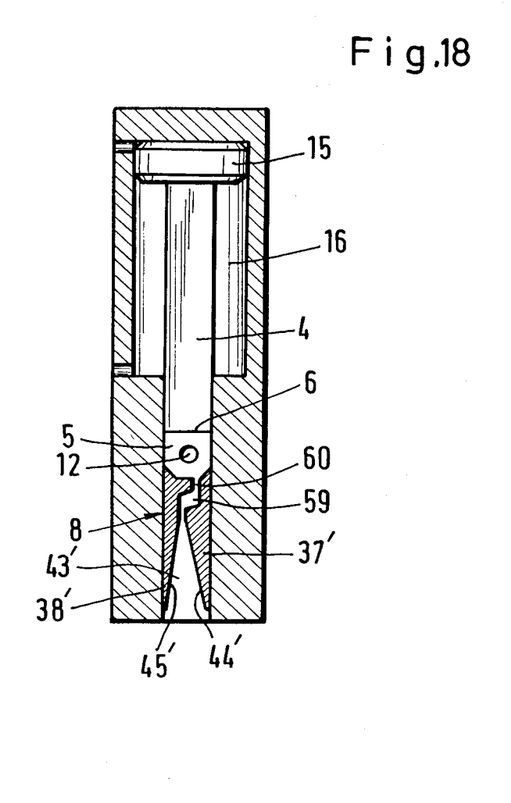
FIGS. 18 and 19 are cross-sectional views of further embodiments of a mixing head similar to FIGS. 7 and 14.
Figure 19:
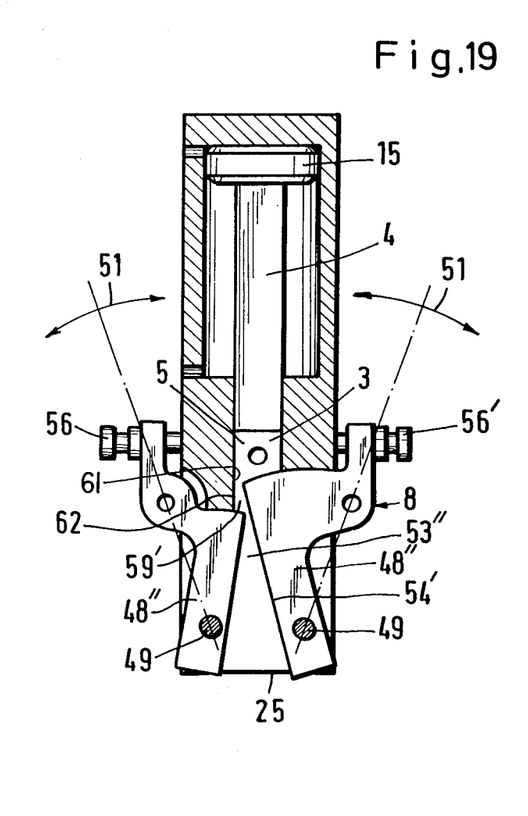

FIGS. 18 and 19 show another embodiment of the mixing head, whereby the respectively facingly arranged wall surfaces 44', 45' (FIG. 18) and 54' (FIG. 19), of the two wall plates 37', 38' (FIG. 18) and 48" (FIG. 19), which constitute the throttle member 8, form in their throttling position diffusor-like flared throttle slit 43' or 53". The mixing chamber 5 and after-mixing chamber 59 (FIG. 18) or 59' (FIG. 19) are also shown. By means of the after-mixing chamber 59 or 59' in the immediate vicinity of the mixing chamber 5, it is possible to attain a further improvement in intensive mixing of the reaction components, as already applied in a similar way also to the embodiment according to FIG. 2 wherein, by means of the profile 34 in the shape of a chamber-like indentation in the wall surface 33 of the wall plate 29 which constitutes the throttle member, there is also formed an after-mixing chamber, after which there is arranged the diffusor part of the throttle slit 28.

The mixing chamber 5 and the after-mixing chamber 59 or 59' are in fluid communication with each other by means of a connection slit 60 or 61. The after-mixing chamber may be constituted by a profiling of at least one of the oppositely facing wall surfaces 44', 45' of the wall plates 37' and 38'. Thereby, one of the wall surfaces 44', 45' can be designed continuously rectilinear, whereas, in that case, the other wall surface is provided with a profiling constituting a chamber-like indentation. In the exemplified embodiment shown in FIG. 18, the facing wall surfaces 44', 45' of the two wall plates 37', 38' are provided with a profiling which together form the after-mixing chamber 59 located after the narrow connection slit 60 of the mixing chamber 5. The diffusor-like flared throttle slit 43' is located immediately after the after-mixing chamber 59.

In the exemplified embodiment according to FIG. 19, the two wall plates 48" constituting the throttle member 8 are of unequal height in the longitudinal direction of the guide channel 4. The after-mixing chamber 59' is constituted by the frontal surfaces 54' of the higher wall plate 48" in conjunction with the oppositely arranged channel wall 62 of the guide channel 3 in the area in which the higher wall plate 48" extends beyond the lower wall plate 48". Immediately after the after-mixing chamber 59' is located the diffusor-like flared throttle slit 53" which, similar to that of all the other exemplified embodiments, extends to the outlet opening 25.

It is understood that the mixing head of all embodiments can be used either for continuous production cycles, or for the discontinuous production of molded parts. The discharging piston 4 is thereby always brought into its cleaning position according to the FIGS. 4, 8, 13, 17, at the completion of a working cycle with specified mixing components. The intake openings 11 and 12 for the mixing components always discharge above the plane of the inlet of the throttle slit 28, 43, 53, 53', or of the connection slit 60, 61 into the mixing chamber 5. According to the drawings, the intake openings 11 and 12 always discharge from oppositely facing walls of the guide channel into the mixing chamber 5, so that the mixing components are injected into the mixing chamber 5 according to the counter-current injection principle. It is understood, however, that the intake openings 11 and 12 can also be arranged in such a way in the channel wall of the guide channel 3, such that the exiting jets of the mixing components are directed at an angle relative to each other.

I claim:

1. A mixing head for mixing components forming a synthetic material comprising a housing having a guide channel, said guide channel having a rectangular cross-sectional configuration formed by four side walls and a longitudinal axis, a discharging piston reciprocably disposed in said guide channel, one portion of said guide channel defining a mixing chamber and another portion of said guide channel forming an outlet channel, said outlet channel having an outlet opening, inlet means for the components leading to said mixing chamber, said piston having a withdrawn position, said piston having an end face which defines a boundary of said mixing chamber when said piston is in said withdrawn position, a throttle means mounted on said housing at said outlet channel and movable between a throttle position within said outlet channel and a withdrawn position withdrawn from said outlet channel, said throttle means when in said throttle position defining another boundary of said mixing chamber, said throttle means when in said throttle position forming a throttle passage in said outlet channel which extends substantially the entire length of said outlet channel, said throttle passage having a throttle slit and a diffusor-like flared portion which progressively increases in cross-sectional area as the outlet opening of the outlet channel is approached.

2. A mixing head according to claim 1, wherein said inlet means leads from one of said side walls of said mixing chamber.

3. A mixing head according to claim 1, wherein said housing has a throttle opening which opens up into said outlet channel, said throttle means being movable mounted in said throttle opening.

4. A mixing head according to claim 3 wherein said throttle means is mounted in said throttle opening for sliding movement in a direction perpendicular to the longitudinal axis of said guide channel.

5. A mixing head according to claim 3 wherein said throttle means is mounted in said throttle opening for pivotal movement about a pivotal axis which is perpendicular to the longitudinal axis of said guide channel.

6. A mixing head according to claim 5, wherein said throttle mean comprises a throttle member, said throttle member having a width, measured in a direction parallel to its pivotal axis, which is equal to the width of one of said side walls of said outlet channel, said one side wall extending parallel to said pivotal axis.

7. A mixing head according to claim 6, wherein said throttle member, when said throttle means is in said throttle position, extends into said outlet channel a distance which is less than the length of another of said side walls of said outlet channel, said other side wall extending perpendicular to said pivotal axis.

8. A mixing head according to claim 5 further comprising means for adjusting the pivotal position of said throttle means to thereby adjust the size of said throttle passage.

9. A mixing head according to claim 5, wherein said throttle means comprises two pivotal throttle members, first pivotal means for pivotably mounting one of said throttle members on said housing, second pivotal means for pivotably mounting the other of said throttle members on said housing, the pivotal axis of said first pivotal means being spaced from the pivotal axis of said second pivotal means, and adjusting means for adjusting the pivotable position of each of said throttle members.

10. A mixing head according to claim 5, wherein said throttle means comprises two pivotably mounted throttle members, each of said throttle members having a first portion and a second portion, said second portions flaring outwardly from the central axis of said outlet channel as the outlet opening of the outlet channel is approached when said throttle means is in said throttling position, said first portions of each of said throttle members being disposed between said mixing chamber and said second portions, said first portions cooperating to define an after-mixing chamber therebetween when said throttle means is in throttling position.

11. A mixing head according to claim 10, wherein each of said throttle members has an upper surface disposed opposite one another and spaced from one another when said throttle means is in said throttling position, said space between said upper surfaces defining a connection slit leading to said after-mixing chamber.

12. A mixing head according to claim 10, wherein the second portion of one of said throttle members is formed as a projection and the second portion of the other of said throttle members is formed as an indentation, said projection and indentation cooperating to define said after-mixing chamber and said connection slit therebetween.

13. A mixing head according to claim 5, wherein said throttle means comprises two pivotably mounted throttle members, each of said throttle members having a different height in the longitudinal direction of the outlet channel, each of said throttle members having opposing faces, the opposing face of one of said throttle members having an extending portion which extends beyond the upstream end of the opposing face of the other throttle member such that the extending portion along with one of the side walls of the outlet channel define an after-mixing chamber.

14. A mixing head according to claim 5, wherein said throttle means comprises a throttle member which has a throttle face which defines a portion of said throttle passage, said throttle face being parallel to the central axis of said guide channel when said throttle member is in said withdrawn position, said throttle face being disposed at an acute angle relative to the central axis of said outlet channel when said throttle means is in said throttling position.

15. A mixing head according to claim 14, wherein said throttle means comprise two of sid throttling members with each of the throttle faces thereof defining said flared portion when said throttling means is in said throttling position.

16. A mixing head according to claim 3, wherein said throttle opening in said housing has a cross-sectional configuration which is symmetrical to the cross-sectional configuration of said throttle means.

17. A mixing head according to claim 1, wherein said throttle means has a throttle wall surface which cooperates with a surface of said outlet channel to define said throttle passage, said throttle wall surface having one portion which progressively slopes further away from said outlet channel surface as the outlet opening of the outlet channel is approached.

18. A mixing head according to claim 17, wherein one of said four side walls defines said outlet channel surface.

19. A mixing head according to claim 17, wherein said throttle wall surface has another portion which is in the form of an indentation, said indentation being located between said mixing chamber and portion of said throttle wall surface.

20. A mixing head according to claim 1, wherein said throttle means comprises a throttle member having a throttle face which defines at least a portion of said throttle passage, said throttle face being aligned with one of said side walls of said outlet channel when said throttle means is in said withdrawn position.

21. A mixing head according to claim 1, wherein said throttle means comprises two throttle members disposed on opposite sides of said outlet channel, each of said throttle members being movable to said throttle position and to said withdrawn position, each of said throttle members having a throttle face with each of said throttle faces being aligned with opposite side walls of said outlet channel when said two throttle members are in said withdrawn positions.

22. A mixing head according to claim 21, wherein said throttle faces of said throttle members oppose each other to define said throttle passage therebetween.

23. A mixing head according to claim 21, wherein each of said throttle members has a mirror-symmetrical cross-sectional configuration relative to a longitudinal plane containing the longitudinal axis of the outlet channel.

24. A mixing head according to claim 1, wherein said throttle means has a side face which slides face-to-face with one of said side walls of said outlet channel when said throttle means moves between its throttle position and its withdrawn position.

25. A mixing head according to claim 1, wherein said throttle means comprises a throttle member slidable between said throttle position and said withdrawn position, said throttle member having a longitudinal length in the sliding direction which is greater than the transverse width of the throttle member.

26. A mixing head according to claim 25, wherein said throttle member has a substantially wedge-shaped cross-sectional configuration.

27. A mixing head according to claim 1, wherein said guide channel has a longitudinal axis, said throttle means having a longitudinal length substantially equal to the longitudinal length of said outlet channel.

* * * * *